United States Patent [19]

Lemke et al.

[11] Patent Number: 4,574,034

[45] Date of Patent: Mar. 4, 1986

[54] METHOD FOR MONITORING THE REVERSAL SYSTEM OF COKE OVEN BATTERIES

[75] Inventors: Otto Lemke; Dieter Stalherm, both of Recklinghausen; Reimer Haack, Haltern-Lavesum, all of Fed. Rep. of Germany

[73] Assignee: Firma Carl Still GmbH & Co. KG, Fed. Rep. of Germany

[21] Appl. No.: 580,790

[22] Filed: Feb. 16, 1984

[30] Foreign Application Priority Data

Feb. 19, 1983 [DE] Fed. Rep. of Germany ....... 3305871

[51] Int. Cl.[4] ............................................. C10B 21/10
[52] U.S. Cl. ............................................. 201/1; 201/41
[58] Field of Search ............... 202/141, 142, 143, 144, 202/151, 270; 201/1, 41

[56] References Cited

U.S. PATENT DOCUMENTS

| 1,597,365 | 8/1926 | Keigley et al. | 201/1 |
| 2,710,281 | 6/1955 | Weissenborn | 201/1 |
| 3,751,342 | 8/1973 | Gidick | 202/141 |
| 3,833,478 | 9/1974 | Tucker | 202/141 |
| 3,875,016 | 4/1975 | Schmidt-Balve et al. | 201/1 |
| 4,085,008 | 4/1978 | Kinzler | 202/141 |
| 4,306,939 | 12/1981 | Wackerbarth | 201/1 |

Primary Examiner—Peter Kratz
Attorney, Agent, or Firm—McGlew and Tuttle

[57] ABSTRACT

A method of monitoring the reversal system of coke oven batteries comprises monitoring the position of the air valves, waste heat discs, and gas cocks in each of the coke ovens of a battery, measuring and centrally registering the temperatures and/or flow rates of the fluids supplied into and discharged from the oven, namely of combustion air, gases and waste gases, comparing the measured values with the desired values corresponding to the position of the system elements, and upon an undue deviation, signals for carrying out safety measures, such as actuating a gas deficiency safety, are automatically delivered. Also measured may be the oil pressure in the lines for supplying the hydraulic signals actuating the reversal mechanism, with again a release of alarm signals. A device for monitoring the reversal system includes an apparatus connected to the valves for shifting all of the valves between an operating position in one characteristic way to an operating condition in another characteristic way. Also means are provided for sensing either the temperature of pressure in the operating system lines which is connected to the means for shifting the operation from one mode to another after the measured values vary beyond a predetermined operation pattern.

3 Claims, 2 Drawing Figures

METHOD FOR MONITORING THE REVERSAL SYSTEM OF COKE OVEN BATTERIES

FIELD AND BACKGROUND OF THE INVENTION

This invention relates in general to coke ovens and in particular to a new and useful method and apparatus for monitoring the reversal system of a regenerative coke oven operation.

The invention relates to a method of monitoring the reversal equipment in coke oven batteries. In coke oven batteries, the reversal system (gas cocks, waste heat valves, and air valves), is usually actuated by means of a hydraulic mechanism. The arrangement is such that the gas cocks, air valves, and waste heat discs of each coke oven are secured to linkages extending the entire length of the battery. The gas cocks are usually coupled to their linkage through cock wrenches, and the air valves and waste heat valves through respective chains. The linkages operate under a hydraulic control and ensure the reversing of the regenerative heating mode of the coke ovens.

In such systems, the linkages are usually monitored for the correct position of limit switches of the linkages, for a break in the linkage, and for the necessary pressure in the hydraulic mechanism. Only a general checking of the linkages of a coke oven battery is possible. Ruptures of the individual chains or cock wrenches cannot be detected.

There have been suggestions of monitoring systems using
  light or laser barriers or
  so called conductor loopes which are interconnected through cluster connectors, and monitored for interruption by a relay.

When light and laser barriers, the explosion-proof design necessary for use in the service passage of coke oven batteries makes the device very expensive and not easy to handle. Further, in very extended batteries difficulties arise with the alignment of such barriers, since, as is well known, a coke oven battery "works", i.e. temperature variations and forces produced by the pusher and acting on the masonry may cause small displacements in the service passage, sufficient to create problems with the light or laser barriers.

With a conductor loop, contact difficulties are common, because of the very corrosive atmosphere and since the loop must remain intrinsically safe in an explosion-proof design. The many wires hanging around in the service passage hamper the maintenance of the linkage and fittings.

SUMMARY OF THE INVENTION

The present invention is directed to a system of monitoring the reversal equipment, particularly individual monitoring of the air valves, waste heat discs, and gas cocks, at the individual coke ovens, operating in a simple and reliable manner and usable for any kind of coke oven battery.

In accordance with the invention the monitoring of the reversal system of the regenerative operation of coke oven batteries is accomplished by measuring and registering on each of the coke ovens of a coke oven battery selectively at least one of the temperature, the flow rate of the fluids flowing into and out of the coke oven, the combustion air and gas and waste gas flow, etc. The measured values are compared with desired values corresponding to a setting of the reversal equipment under predetermined optimum operational conditions. The system is such that upon undue deviation of the measured values from the desired values, a control is operated to make a change in the operation such as to actuate the system for selecting any gas deficiency. The apparatus may comprise means for measuring for example the temperature in each of a waste gas supply line and a bridge gas supply line and for measuring the values of temperature and evaluating the measured values so as to provide for a reversal control when the values deviate beyond a predetermined situation.

The general purpose of waste heat valves of a coke oven battery is to control, in a regenerative cycle, the air or lean gas supply into the respective oven and the waste gas escape from the oven. The air valves, gas cocks, and waste heat discs thus periodically vary their positions from open to closed and vice versa. Relatively accurately determinable temperatures are associated with the individual fluids. Under normal operating conditions, temperatures below 100° C. may be assumed for the inflowing combustion air and the supplied lean gas, and temperatures above 200° C. for the outflowing waste gas.

In accordance with the invention, the desired values are to be adjusted within these ranges. For example, a temperature not below or above the indicated limits would be considered an undue deviation from the desired value. By means of suitable measuring devices, such as thermocouples, resistance thermometers, contact thermometers, temperature switches, etc., the temperature in the waste heat valve can be measured and the measuring signals transmitted to a central control station where the values are registered and compared with the desired values corresponding to the setting of the reversal equipment. Upon an undue deviation from the desired value, an alarm signal is automatically actuated inducing the necessary safety measure, for example causing an automatic actuation of a gas deficiency safety device.

According to the invention, it suffices, particularly in combined air-waste heat valves or lean gas-waste heat valves, to measure the temperature of combustion air and waste heat gas, or lean gas and waste heat gas, at a single measuring location. A single monitoring element is thus sufficient for covering two control elements, such as an air valve and a waste heat disc, or a lean gas cock and a waste heat disc. The invention may, of course, also be applied to systems where separate ways are provided for the air or gas supply, and the waste gas discharge.

Another advantage of the invention method is that these continual temperature measurements give information on the heating condition of the individual heating walls.

For head-heated ovens, the invention provides in addition, the measuring of the rich gas at the supply side in every one of the rich gas ducts. Here again, it may be assumed that the rich gas has a temperature in any case below 100° C., for example. Thus, if at a certain time after the reversal to rich gas supply, the temperature in the rich gas duct did not fall below the desired value, an alarm signal is delivered.

To monitor the rich gas and/or lean gas ducts in the individual supply lines, it is further possible, in accordance with the invention, to provide flowmeters, for example between the distributor main and the reversal cocks, to detect whether or not there is a flow of gas. The signal resulting therefrom may then be evaluated in a similar way as described above in connection with the predetermined desired value for the reversal state.

Both the temperature and the flow monitoring employ simple and reliable mechanisms which can be installed at relatively low cost. Neither soiling, nor the above-mentioned movements of the masonry can affect this measuring method. The needed measuring devices have a long life and do not require maintenance.

With the invention, the reversal system may advantageously measure fluid pressure in the supply lines to the hydraulic cylinders for actuating individual reversal linkages and for centrally registering these values. The values are then compared to the desired values corresponding to the setting of the reversal equipment and upon undue deviation from the desired values, signals for taking necessary safety measures or opposite measures are automatically released.

For this purpose, suitable pressure gauges, such as contact manometers, electrical pressure indicators or switches, are mounted in the oil supply line to the working cylinder. Upon exceeding a pressure which is adjustable to correspond to the breaking load of the cock wrench, again an alarm is delivered corresponding to the reversal cycle or interrupting this cycle. This kind of monitoring has the particular advantage of being capable of releasing an alarm signal even before a failure of the cock wrench. Extended repair work may thus be avoided. Finally, still in accordance with the invention, the entire monitoring equipment may be self-monitoring, i.e. automatically deliver a disturbance signal after a failure of a measuring station.

The invention provides an improved method and apparatus for easily effecting the operation of a regenerative coke oven to effect the necessary reversals during regenerative stage changeovers.

A further object of the invention is to provide an improved device for operating a regenerative coke oven which is simple in design, rugged in construction and economical to manufacture. The various features of novelty which characterize the invention are pointed out with particularity in the claims annexed to and forming a part of this disclosure. For a better understanding of the invention, its operating advantage and specific objects attained by its uses, reference is made to the accompanying drawings and descriptive matter in which preferred embodiments of the invention are illustrated.

DESCRIPTION OF THE PREFERRED EMBODIMENTS

Figure 1:
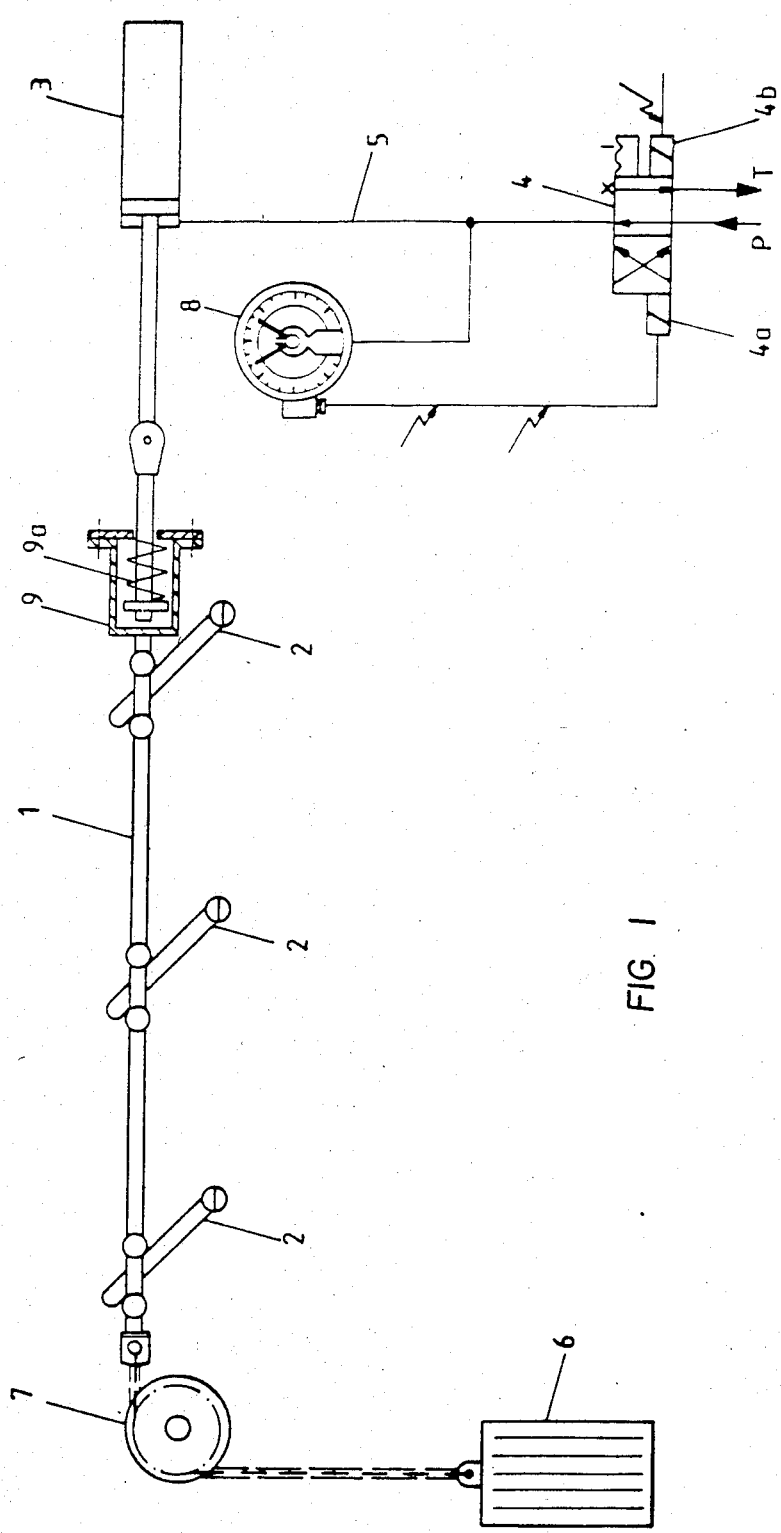
FIG. 1 is a diagrammatical view of a linkage for actuating the gas reversal cocks.

Referring to the drawings in particular the invention embodied therein comprises a method of monitoring the reversal system of coke oven batteries wherein the various control lines for supplying various changeovers of gas flow directions are controlled by cock wrenches of plural gas reversal cocks, designated 2. These cocks are driven by linkages from a control system including a hydraulic cylinder 3 which is actuated through a line 5 in response to pressure changes which are sensed in various parts of the operating lines by pressure gauge.

Monitoring of the hydraulic pressure is as follows:

To open the gas reversal cocks, namely to turn cock wrenches 2, the linkage 1 shown in FIG. 1 is moved by means of hydraulic cylinder 3 to the right. To this end, cylinder 3 is supplied with operating fluid, through line 5 and a solenoid valve 4 which is energized by a magnet 4b.

To close an reversal cocks, linkage 1 is moved to the left. To this end, solenoid valve 4 is reversed through the electric control, by energizing magnet 4a, and the operating fluid is discharged from cylinder 3 through line 5 and into a tank through line T. A counterweight 6 is provided by which the linkage is now moved to the left, toward a corner pulley 7, to close the gas reversal cocks.

Should the normal fluid pressure, set at the pressure gauge 8 for opening the gas reversal cocks, reach a certain higher set pressure due to a stuck gas reversal cock, pressure valve 4 is reversed to relieve the pressure in the cylinder.

To compensate for the inertia of the hydraulic and mechanical system in case of a failure and thus prevent either the stuck cock wrench 2 from breaking, or the cock from being torn off, a spring buffer 9 is provided. Spring 9a is biased up to the release pressure set on pressure gauge 8, so that in normal operation, buffer 9 does not move.

If a gas reversal cock gets stuck during a closing operation, the linkage is stopped, since the counterweight is dimensioned to avoid breaking of a cock wrench, or tearing off of a cock. The reversal is interrupted and the normally provided limit switches are not actuated, which, for example, would actuate a gas deficiency safety device.

Figure 2:
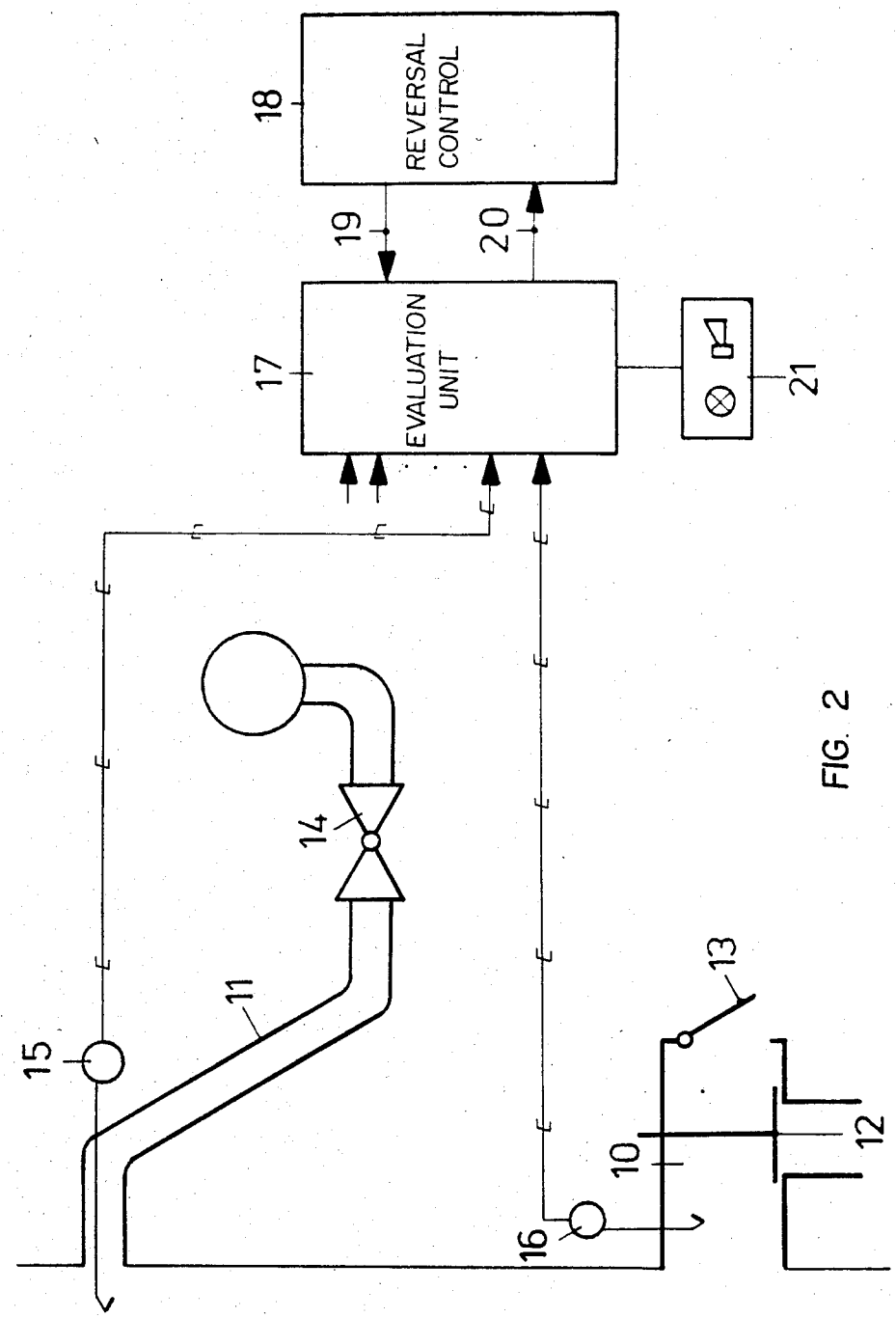
FIG. 2 is a diagrammatical view of the arrangement with a waste heat valve and a rich gas supply to a head-heated coke oven.

An explanation of the invention using temperature measurements (the use of flow measurements being similar) follows:

FIG. 2 shows a waste heat valve 10 and a rich gas supply duct 11 as provided in a head-heated coke oven. Depending on the phase of the heating cycle, waste heat disc 12 of valve 10 is closed and air valve 13 is opened, or conversely. A coke oven battery has a plurality of these elements. At the same time, rich gas reversal cock 14 is open and rich gas passes through, or, vice versa, the cock is closed and conducts only degraphitizing air. The temperature sensors such as thermocouplers 15,16, pick up the temperatures at the mouth of the rich gas duct 11 and in the waste heat valve 10, respectively. As long as rich gas is supplied, thermocouple 15 picks up a significantly lower temperature than if a substantially smaller amount of degraphitizing air is supplied. If air valve 13 at the waste heat valve is open, the temperature indication through thermocouple 16 is below 100° C., if waste heat disc 12 is open, the indicated temperature is above 200° C.

With one half of the equipment of a coke oven battery being in one state and the other half in the reversed state, a reversal operates as follows, for example:

The open rich gas cocks 14 close. With a regular closing, the temperature of thermocouples 15 distinctly rises for a short period of time. This is registered in an evaluating unit 17 and the reversal operation continues. Waste heat discs 12 and air valves 13 open or close, depending on their initial position. The temperature of thermocouples 16 rises or drops abruptly. If this corresponds to the desired values, the reversal continues.

One half of the reversal cocks 14 open and, with a regular opening, the temperature of thermocouple 15 drops. The heating phase starts and is continuously further monitored up to the next reversal. If a deviation occurs at any point, an alarm 21 is given and a safety action is started at 20. The measured values are processed and the desired values are set through evaluating unit 17 to which the corresponding instructions 19 are directed from a control unit 18 of the reversal system.

While specific embodiments of the invention have been shown and described in detail to illustrate the application of the principles of the invention, it will be understood that the invention may be embodied otherwise without departing from such principles.

What is claimed is:

1. A method of monitoring the reversal system of regenerative operations in a coke oven battery, said coke oven battery having a plurality of coke ovens with a plurality of air and waste heat valves and a plurality of rich gas supply ducts each with a rich gas reversal valve, comprising separately measuring the temperature in each air and waste heat valve during the flow of waste heat and during the flow of air, comparing each of the measured temperatures with desired values for the flow of waste heat and the flow of air respectively and, upon an undue deviation of any of the measured values from the desired values, generating control signals which indicate the failure of at least one air and waste heat valve from operating correctly during a regenerative operation.

2. A method according to claim 1, including measuring the temperature in each rich gas supply duct, comparing the measured temperature for each rich gas supply duct with desired set values of the temperature during the regenerative operation, and upon a deviation of any one of the measured temperatures for the rich gas supply ducts, generating the control signal.

3. A method according to claim 2, wherein the coke oven battery includes a plurality of gas reversal cocks each having a wrench, a linkage connected to each wrench, and a hydraulic cylinder connected to the linkage for moving each wrench, including measuring the pressure of fluid supplied to the cylinder for moving each wrench, comparing the measured pressure with a desired pressure representing a maximum of pressure to be exerted on each wrench to reverse the gas reversal cocks, and when the measured pressure exceeds the desired pressure, switching off the supply of fluid to the cylinder.

* * * * *